United States Patent [19]

Shafer

[11] Patent Number: 5,094,406
[45] Date of Patent: Mar. 10, 1992

[54] MISSILE CONTROL SYSTEM USING VIRTUAL AUTOPILOT

[75] Inventor: Daniel E. Shafer, Bellevue, Wash.

[73] Assignee: The Boeing Company, Seattle, Wash.

[21] Appl. No.: 638,349

[22] Filed: Jan. 7, 1991

[51] Int. Cl.$^5$ ............................................. F41G 7/00
[52] U.S. Cl. ................................................ 244/3.21
[58] Field of Search .......................... 244/3.15, 3.21

[56] References Cited

U.S. PATENT DOCUMENTS

| | | | |
|---|---|---|---|
| 2,873,074 | 2/1959 | Harris, Jr. et al. | 244/14 |
| 3,900,175 | 8/1975 | Eckerstrom et al. | 244/3.13 |
| 3,946,968 | 3/1976 | Stallard | 244/3.21 |
| 4,044,237 | 8/1977 | Cowgill et al. | 244/3.15 |
| 4,047,014 | 9/1977 | Morrison et al. | 235/189 |
| 4,080,655 | 3/1978 | Burger et al. | 364/434 |
| 4,318,515 | 3/1982 | Leek | 244/3.16 |
| 4,347,730 | 9/1982 | Fisher et al. | 73/1 E |
| 4,525,784 | 6/1985 | Hamel et al. | 364/434 |
| 4,831,544 | 5/1989 | Hojo et al. | 244/3.21 |

Primary Examiner—Charles T. Jordan
Attorney, Agent, or Firm—Christensen, O'Connor, Johnson & Kindness

[57] ABSTRACT

An improved control system for a missile that minimizes the roll motion required to steer in a given command direction. The guidance and navigation system produces a steering command in a body coordinate system. The steering command has pitch and yaw components, and indicates the direction of a desired lateral acceleration. The steering command is transformed into a selected one of N transformed coordinate systems. The selection is made such that the yaw/pitch ratio of the steering command is reduced. The transformed steering command is input to the autopilot, and the autopilot outputs are transformed back to the body coordinate system before being used by the fins or other steering mechanism.

6 Claims, 6 Drawing Sheets

MISSILE CONTROL SYSTEM USING VIRTUAL AUTOPILOT

GOVERNMENT RIGHTS

The United State Government has rights in this invention, under contract No. N00024-83-C-6039.

FIELD OF THE INVENTION

The present invention relates to control systems for missiles, rockets, and similar aerospace vehicles.

BACKGROUND OF THE INVENTION

The orientation of an airplane in space is commonly described in terms of its roll, pitch and yaw. Roll refers to rotation about a roll axis that generally extends from the nose to the tail of the aircraft. Pitch is angular rotation about a pitch axis that is normal to the roll axis, and that generally passes through the wings of the aircraft. Yaw is angular rotation about a yaw axis that is normal to the pitch and roll axes, and that is perpendicular to the ground during level flight.

The lift-generating surfaces of an aircraft are highly asymmetric, and significant lift can, in general, be generated only along the yaw axis. Therefore, to turn an aircraft in level flight to the right or left, it is necessary to first roll the plane such that its yaw axis is no longer vertical, so that the lift vector generated by the wings has a component in the desired turn direction. This maneuver is generally described by the phrase "roll to turn".

One well-known type of missile comprises an approximately symmetric body, with fins projecting from the body near the tail end of the missile. In a so-called "cruciform" design, the fins are spaced 90° from one another about the longitudinal, roll axis of the missile. Because of its symmetry, such a missile can, in principal, generate lift in any direction normal to the roll axis. However, it is usual that such missiles can generate more lift, and/or fly at higher ratios of lift to drag, when the lift vector is in some direction rather than in others.

For such missiles, it is advantageous to orient the missile so that the direction of the maximum lift capability is in the direction of the desired acceleration. This consideration applies to cruciform missiles of the type described above. In particular, a cruciform missile can accelerate normal to its flight path more rapidly in a plane that lies between the fins than in a plane containing a pair of the fins. This characteristic is summarized by stating that such missiles accelerate better in an "x" configuration (relative to the plane of the desired acceleration) than in a "+" configuration. It is therefore preferable, in prior art missile control systems, to orient the autopilot pitch plane such that it lies between the fins. Then, to maneuver such a missile in a given lateral direction, the autopilot pitch plane is aligned with the desired movement direction by causing the missile to roll either to the right or left until the missile is in the desired x configuration relative to the plane containing the desired acceleration.

From the above, it may be seen that if the pitch autopilot is implemented such that it can maneuver equally well in both directions in the pitch plane, then it will generally be necessary for the missile to rotate up to 90° clockwise or counterclockwise about the roll axis before or while accelerating laterally, in order to align the pitch plane with a desired command direction. If the pitch autopilot has a preferred direction in the pitch plane then rotation of up to 180° may be required. The large roll angles that may be required are a significant limitation of the missile responsiveness to commanded changes in its flight path direction.

In order to obtain good, or in some cases, even adequate autopilot performance, the pitch and yaw autopilot channels must be different, even though the missile is symmetrical. The reason is that the airflow patterns around the missile are only symmetrical in the yaw (X,Y) plane when the missile is at a non-zero angle of attack and at zero sideslip. This causes the aerodynamic stability derivatives to be different in pitch and yaw, which, in turn, requires different gains in the pitch and yaw autopilot channels. This is the reason for requiring the autopilot pitch plane to be in the direction of the commanded maneuver. In the prior art, this necessitated rolling the missile as described above.

SUMMARY OF THE INVENTION

The present invention provides an improvement to a control system for a missile, such that the roll motion required to steer in a given command direction is minimized. The term "missile" is used herein in its broad sense to include aerospace vehicles having lift generating surfaces and guidance and navigation systems, but excluding conventional aircraft.

In a preferred embodiment, the improved control system comprises a guidance and navigation system that produces a steering command in a body coordinate system. The steering command has pitch and yaw components, and indicates a direction of a desired acceleration of the missile in a plane normal to the missile longitudinal axis. The control system further comprises means for transforming the steering command in the body coordinate system into a transformed steering command in one of N different transformed coordinate systems, N being greater than 1. The value of N is typically determined by the number of planes of symmetry of the missile.

In the selected transformed coordinate system, the ratio of the yaw component of the steering command to the pitch component of the steering command is reduced, as compared to the ratio in the body coordinate system. The transformed steering command is received by an autopilot, and the autopilot produces corresponding pitch, yaw, and roll output signals in a conventional manner. In a preferred embodiment, the roll output signal is designed to cause the missile to roll to an attitude that will reduce the yaw component of the steering command in the transformed coordinate system to zero. These autopilot output signals are then transformed back into the body coordinate system, for use by the fins or other control mechanisms to steer the missile in the specified steering direction.

DETAILED DESCRIPTION OF THE PREFERRED EMBODIMENT

Figure 1B:
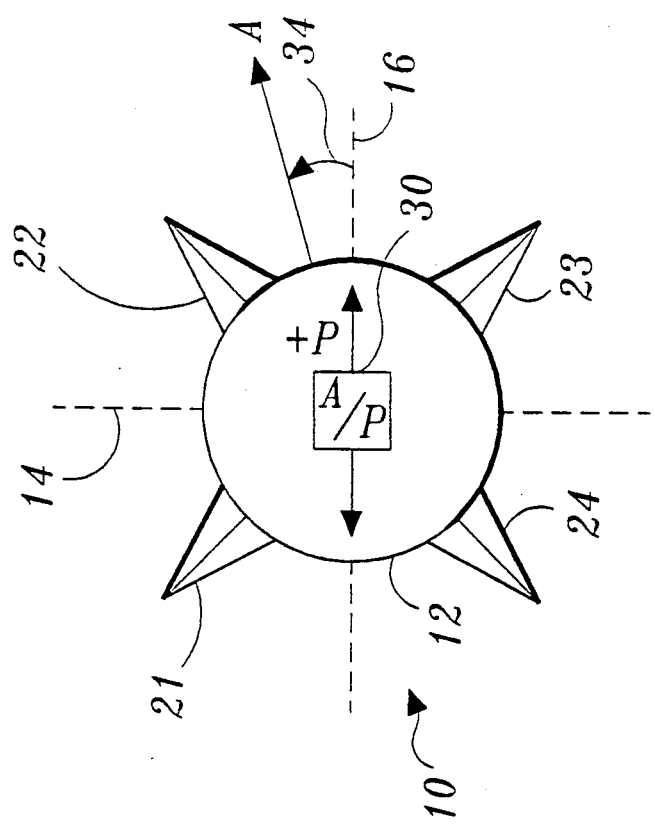
FIGS. 1A and 1B are schematic drawings showing the relationships between autopilot axes, body axes, and a lateral acceleration command for a cruciform missile.
Figure 1A:
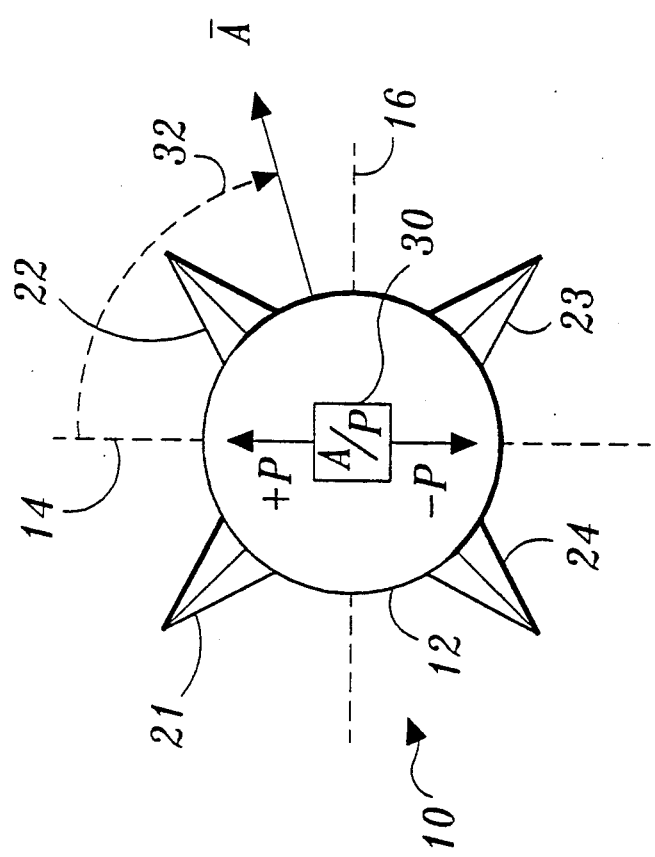

FIG. 1A presents a schematic, axial (end on) view of a missile or rocket 10 having a cylindrical body 12 and four fins 21-24 evenly spaced from one another around body 12. FIG. 1A also illustrates orthogonal axes 14 and 16 that are presumed to be fixed with respect to body 12, and will therefore be referred to hereafter as "body" axes. The body axes are normal to the longitudinal axis of the missile, and are oriented between the fins.

FIG. 1A also illustrates autopilot (A/P) 30 within missile 10. In a conventional flight control system, the autopilot uses body axes 14 and 16 for its calculations, and the autopilot can therefore be said to be "fixed" with respect to the missile and body axes. FIG. 1A also illustrates the pitch plane ±P of the autopilot, aligned with body axis 14. As described previously, to maneuver laterally, the autopilot pitch plane should be aligned with the desired lateral movement direction.

Assume now that the guidance and navigation system of the missile determines that the missile should maneuver laterally in the command direction labeled $\overline{A}$, with the bar symbol indicating a vector quantity. The command direction $\overline{A}$ may be thought of as being temporarily fixed in inertial space. To perform this maneuver, the autopilot pitch plane should be aligned with direction $\overline{A}$. It is therefore necessary for the missile to roll through angle 32, such that body axis 14 and the autopilot pitch axis are aligned with the direction $\overline{A}$. Because the body axes are positioned between the fins, this roll maneuver will also position the missile in the preferred x configuration with respect to the desired maneuver direction. In general, it can be seen that a roll of up to 90° may be required in order to align the autopilot pitch plane P with a given command direction. In a missile in which it was necessary to align the positive pitch plane +P with the command direction, a roll of up to 180° might be required in a given case.

FIG. 1B illustrates the technique of aligning the autopilot pitch plane to the command direction in accordance with the present invention. FIG. 1B illustrates the same missile 10 as FIG. 1A, including the same body axes 14 and 16. However, in FIG. 1B, before the missile rolls, the autopilot is first "rotated" through an angle of 90°, such that the autopilot pitch axis P is aligned with body axis 16 rather than body axis 14. As a result, it is now only necessary to roll the missile through a relatively smaller angle 34 in order to align the autopilot pitch plane with command direction $\overline{A}$.

Figure 2:
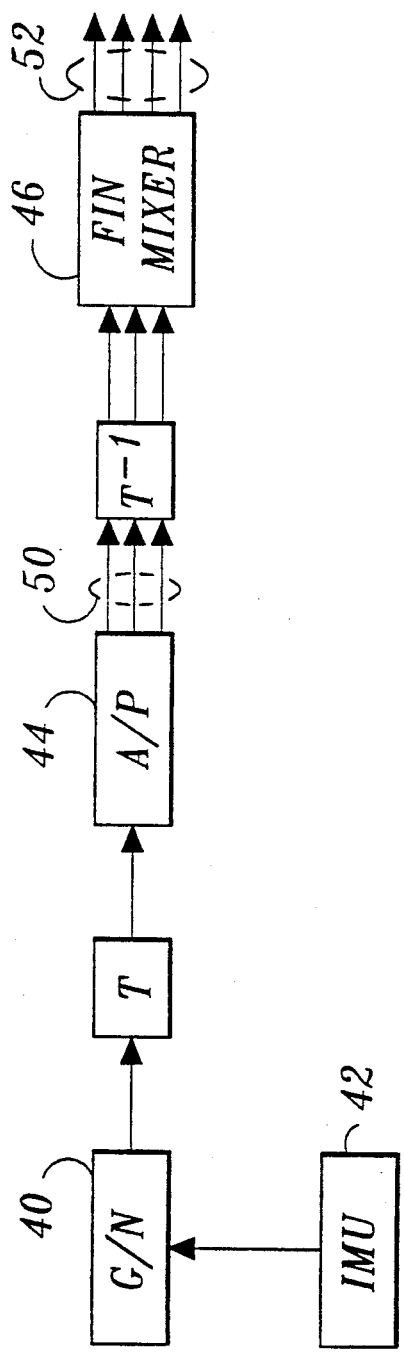
FIG. 2 shows a block diagram of a guidance and control system for a missile, including a coordinate transformation in accordance with the present invention.

The "rotation" of the autopilot indicated in FIG. 1B may be accomplished in a manner illustrated in FIG. 2, which presents a simplified view of a control system for a missile. The control system includes guidance and navigation (G/N) unit 40, inertial measurement unit (IMU) 42, autopilot (A/P) 44, and fin mixer 46. Ignoring the blocks marked T and $T^{-1}$ for the moment, the system operates as follows. IMU 42 senses the motion of the missile in inertial space, and provides data representing such motion to guidance and navigation system 40.

The guidance and navigation system compares the missile's trajectory with the desired trajectory, and issues appropriate steering commands to the autopilot. The autopilot uses the steering commands to produce pitch, yaw, and roll commands on lines 50 for steering the missile along the desired course. The pitch, yaw, and roll commands are converted by fin mixer 46 into appropriate fin commands on lines 52, the fin commands causing the fins to deflect in a manner so as to produce the maneuver specified by the pitch, roll, and yaw commands.

The "rotation" of the autopilot shown in FIG. 1B may be achieved by inserting coordinate transformation T between guidance and navigation unit 40 and autopilot 44, and inverse coordinate transformation $T^{-1}$ between autopilot 44 and fin mixer 46. Coordinate transformation T modifies the signals produced by the guidance and navigation unit, so that they appear in a transformed coordinate system. In the transformed coordinate system, the autopilot pitch plane is more nearly aligned with the command direction $\overline{A}$, as indicated in FIG. 1B. Autopilot 44 then performs all calculations in the transformed coordinate system. This includes the calculation of the roll command which causes the missile to roll so that the pitch plane lines up with the steering command $\overline{A}$. The pitch, yaw and roll autopilot outputs in the transformed coordinate system are produced on lines 50. The autopilot outputs are then subjected to a reverse transformation $T^{-1}$, so that the commands received by the fin mixer are in the original coordinate system. Because the autopilot rotation is achieved by transforming signals rather than actual physical rotation, the rotated autopilot can be said to be a "virtual" autopilot.

In one preferred embodiment of the invention, coordinate transformation T will either apply a rotation of 90° for the case in which command direction $\overline{A}$ is located closer to axis 16 than to axis 14, or apply no rotation for the case in which the command direction is closer to axis 14. As a result, the required roll maneuver will not exceed 45°. By way of comparison, for a prior art system such as the one shown in FIG. 1A, a roll of up to 90° might be required, even in a system in which the positive pitch plane direction (+P) and the negative pitch plane direction (−P) were equivalent.

Figure 3B:
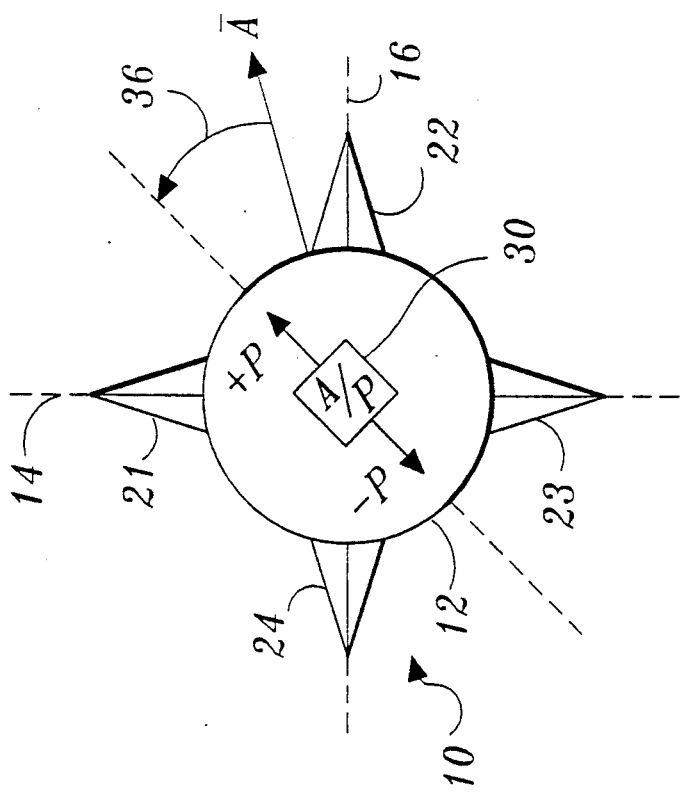
FIGS. 3A–3D are schematic drawings showing the relationship between autopilot axes, body axes, and an acceleration command for a second embodiment of the invention.
Figure 3A:
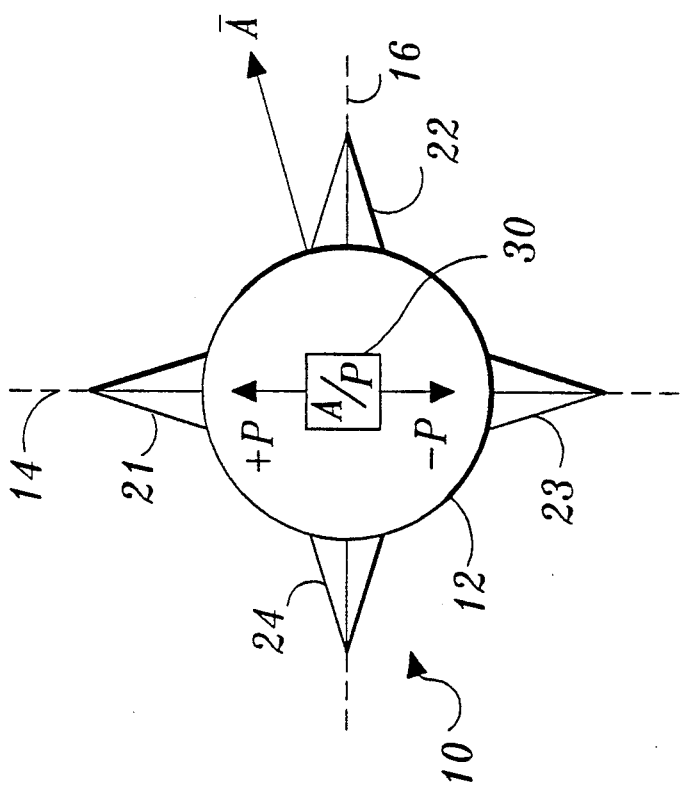
Figure 3D:
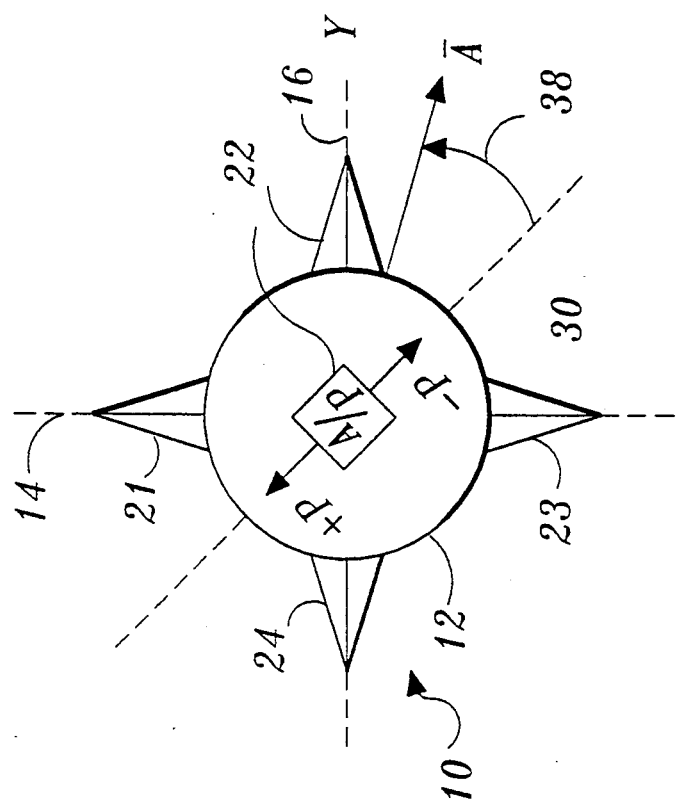
Figure 3C:
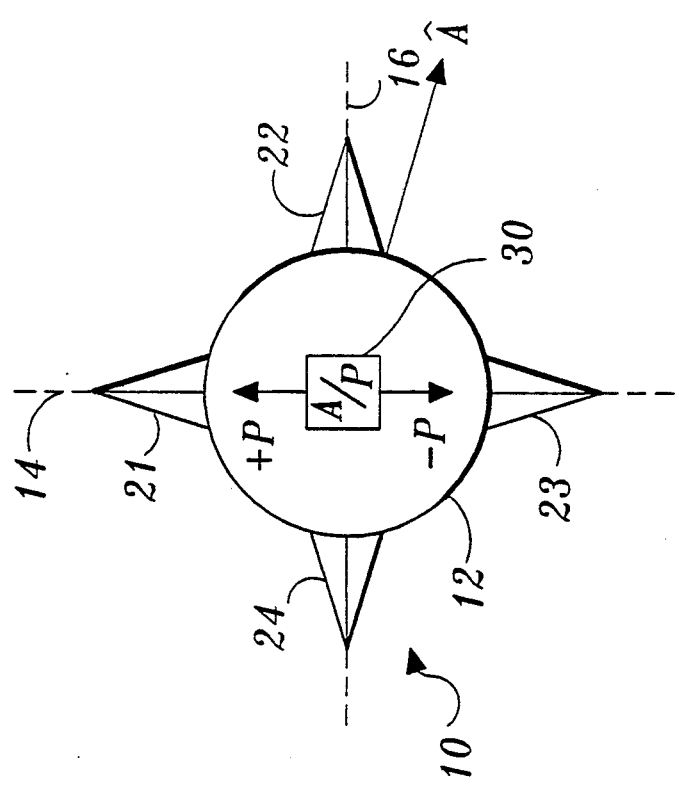

FIGS. 3A-3D illustrate an alternative embodiment of the invention, in which fins 21-24 are initially aligned with body axes 14 and 16, rather than being aligned between the body axes as in FIG. 1A. To maneuver the missile in a given lateral direction, the missile is rotated so that two conditions are fulfilled. First, the autopilot pitch plane should be aligned with the desired command direction. Second, the missile should be rotated to an x rather than + configuration with respect to the command direction. Thus in the missile illustrated in FIG. 3A, a preferred autopilot "rotation" is as illustrated in FIG. 3B. In this case, the autopilot has been rotated through an angle of +45°, with the positive sign here indicating a clockwise rotation. The result is that the autopilot pitch plane is now oriented between the fins, and the required missile rotation angle 36 is less than 45°. The same rotation would also apply for the case in which command direction $\overline{A}$ was located between fins 23 and 24. On the other hand, when the steering command direction $\overline{A}$ is between fins 22 and 23, as shown in FIG. 3C, or between fins 21 and 24, then the desired rotation is −45° (counterclockwise). This produces the configuration shown in FIG. 3D, in which the required missile rotation angle 38 is again less than 45°. Thus, for an embodiment in which the untransformed autopilot axes are in the plane of one of the pairs of fins, coordinate transformation T preferably applies a rotation of +45° or −45°.

In the embodiments illustrated in FIGS. 1 and 3, one of two possible coordinate transformations T is selected, to minimize the required rotation of the missile. In general, the invention may operate by selecting one of N possible transformations, N being greater than or equal to 2. In general, the greater the value of N, the smaller the required roll angle to align the autopilot pitch plane with the command direction. The maximum number of preferred directions (i.e., those which result in either increased lift or better stability) is related to the number of planes of symmetry. Missiles with an even number (n) of planes of symmetry will have N=n/2 preferred directions of the pitch plane. Those with an odd number (n) of planes of symmetry will have N=n preferred directions.

Figure 4:
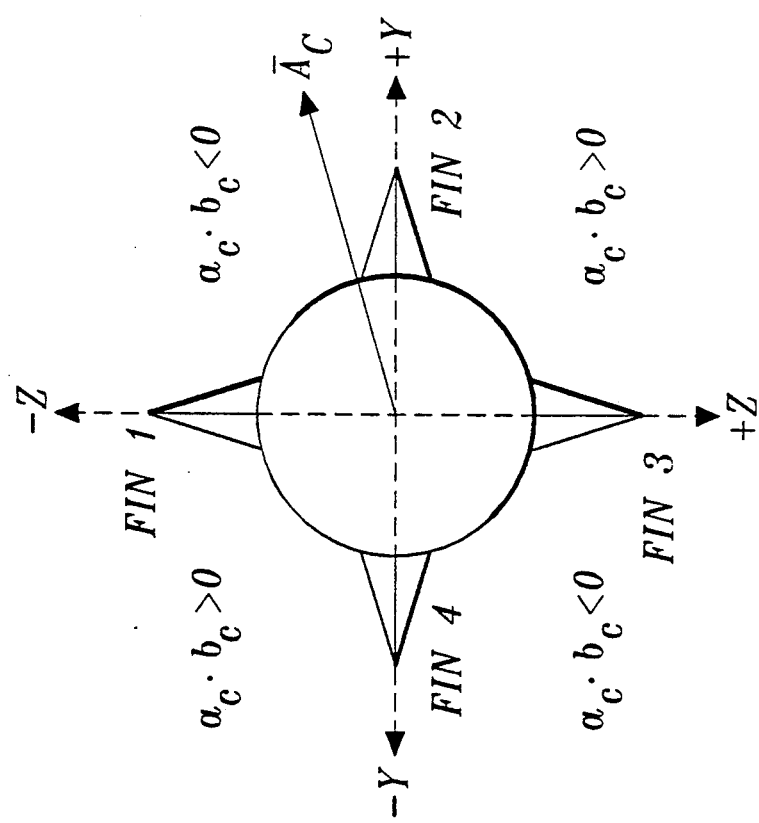
FIG. 4 is a schematic drawing indicating the technique for determining the angle of the desired coordinate rotation.

For the purpose of describing a particular embodiment of the invention in greater detail, it will be assumed that the steering command, and the other vector quantities input to the flight control system, are expressed in a body coordinate system in which the X axis is coincident with the roll axis of the missile, i.e., with the central longitudinal axis of the missile. As shown in FIG. 4, the Y axis will be assumed to be coincident with fins 2 and 4, and the Z axis will be assumed coincident with fins 1 and 3, with fins 2 and 3 being along the positive directions along these respective axes. It will further be assumed that the autopilot pitch axis contains the Z axis. In such a coordinate system, the steering command vector can be written in terms of its components along the X, Y, and Z axes as follows:

$$A_c = \begin{bmatrix} 0 \\ b_c \\ a_c \end{bmatrix} \quad (1)$$

where the X (roll) component is assumed to be zero, and the Y (yaw) and Z (pitch) components are $b_c$ and $a_c$, respectively. The coordinate transformation T required to transform $\overline{A}_c$ into the equivalent vector $\overline{A}_T$ in the rotated coordinate system can be written:

$$A_T = T \cdot A_c = \begin{bmatrix} \cos\alpha & \sin\alpha \\ -\sin\alpha & \cos\alpha \end{bmatrix} \cdot A_c \quad (2)$$

where for simplicity the X coordinate has been dropped. The quantity $\alpha$ is the angle of rotation in the Y-Z plane between the new and old coordinate systems.

As previously described in connection with FIGS. 3A–3D, the desired coordinate transformation T is one that reduces the angle between the Z axis (the autopilot pitch plane) and the steering command, and that also positions the Z axis halfway between the fins, such that the missile is in the x configuration with respect to the steering command. Thus in the case shown in FIG. 4 in which the acceleration command $\overline{A}_c$ lies between fins 1 and 2, the desired rotation is clockwise by 45°. If the acceleration command $\overline{A}_c$ lay between fins 3 and 4, a clockwise rotation by 45° would also produce the desired result. On the other hand, if the acceleration command lay between fins 2 and 3 or between fins 4 and 1, the desired rotation would be counterclockwise by 45°.

Thus the required rotation is in one direction when the product $a_c \cdot b_c$ is greater than zero, and in the opposite direction when this product is less than zero. The coordinate transformation matrix T can therefore be written:

$$T = .707 \begin{vmatrix} 1 & -P_s \\ P_s & 1 \end{vmatrix} \quad (3)$$

where 0.707 is the sine (and cosine) of 45°, where $P_s$ equals +1 when the product $a_c \cdot b_c$ is greater than or equal to zero, and where $P_s$ equals −1 when the product $a_c \cdot b_c$ is less than zero. These products are indicated in the four quadrants in FIG. 4. Substitution of equation (3) into equation (2) indicates that, as expected, the ratio of the yaw to the pitch components of the steering command is smaller in the desired transformed coordinate system than in the original body axis system, i.e., $b_t/a_t$ is less than $b_c/a_c$.

Figure 5:
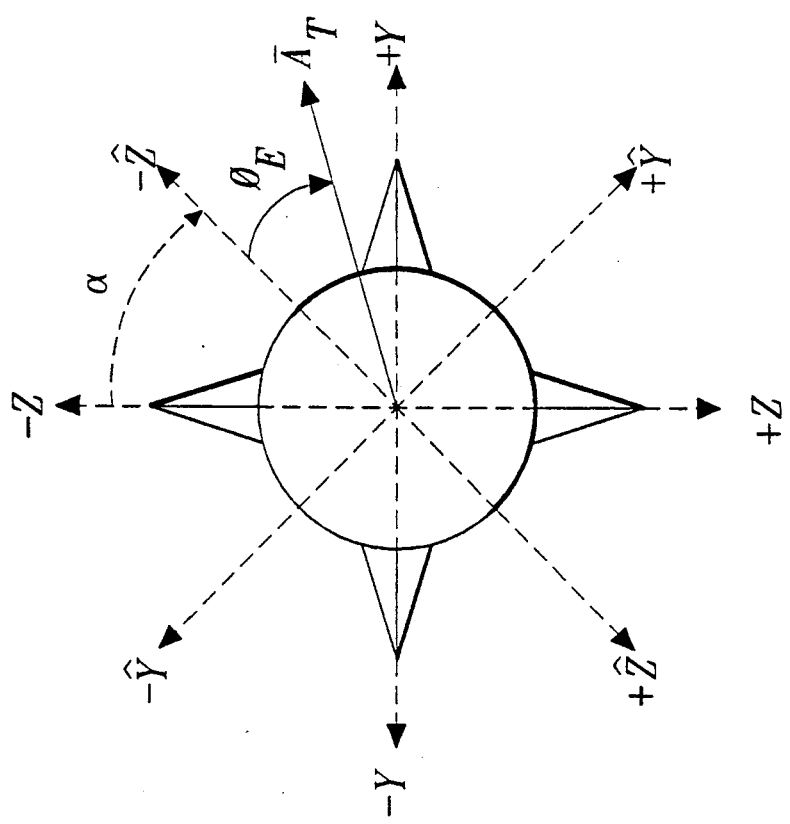
FIG. 5 is a schematic drawing showing rotation of the body coordinate system to the transformed coordinate system.

FIG. 5 shows the orientation of the coordinate system Y, Z produced by transformation T, i.e., by a clockwise rotation through an angle $\alpha$ equal to 45°. After the transformation, the roll error $\phi_e$, i.e., the angle between the acceleration command $\overline{A}_T$ and the transformed pitch plane Z, is given by $$\phi_e = \tan^{-1}(-b_t/a_t) \quad (4)$$

where $b_t$ (yaw) and $a_t$ (pitch) are the components of the command vector $\overline{A}_T$ in the new coordinate system. For computational purposes Equation (4) can be simplified to $$\phi_e = -b_t/a_t \quad (5)$$

This approximation becomes exact as $\phi_e$ approaches zero, and it is only near zero that accuracy is required. It should be noted that if the sign of the acceleration command $\overline{A}_T$ is reversed, the roll error $\phi_e$ remains the same. Since the missile has no preference with respect to positive or negative angles of attack, this formulation results in the minimum roll required to place the steering command in the autopilot pitch plane. To avoid noisiness or instability as the total angle of attack command nears zero, the roll attitude and the sign of $P_s$ may be held constant when the angle of attack command is below a predetermined threshold.

Figure 6:
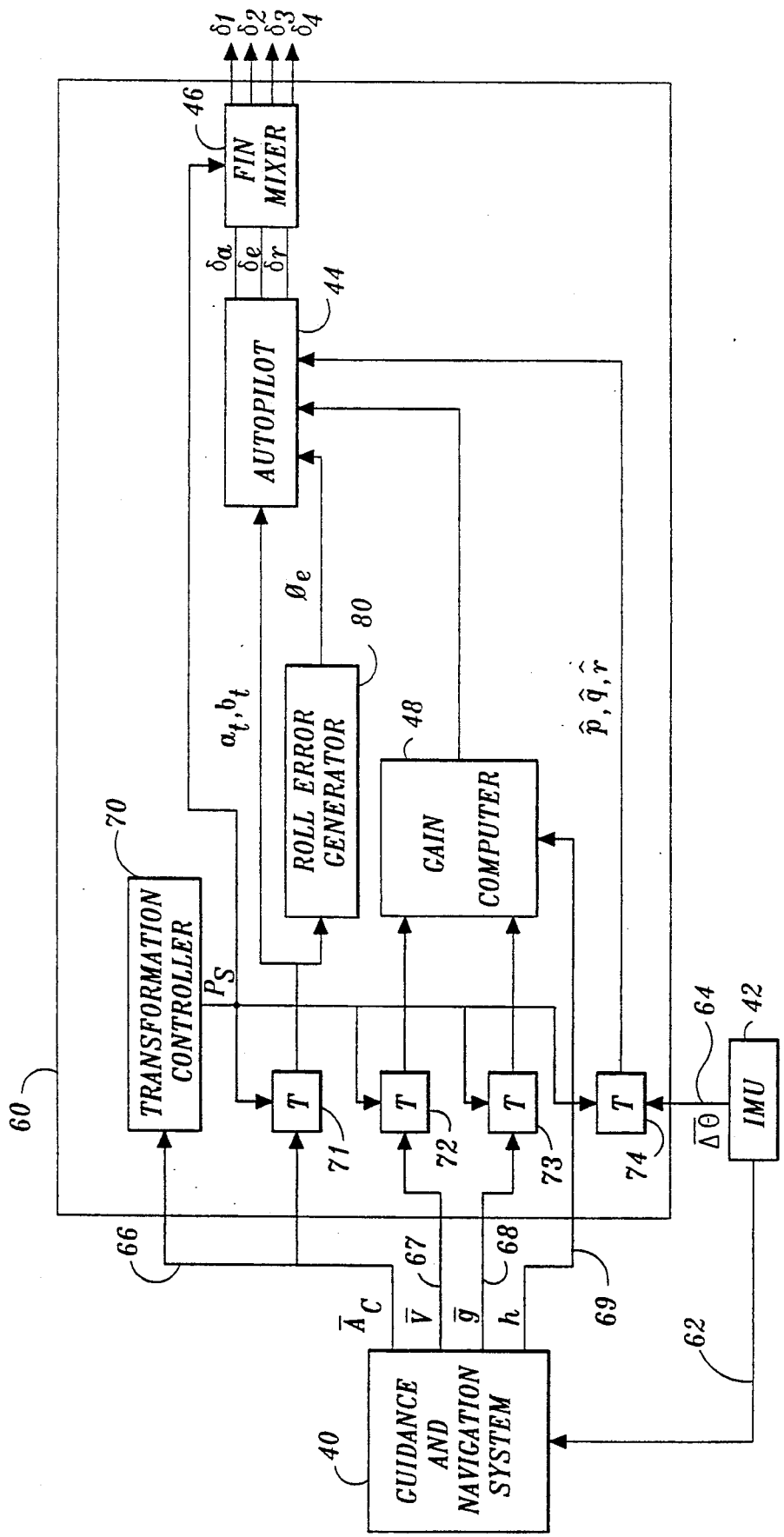
FIG. 6 is a more detailed block diagram of a control system including the present invention.

FIG. 6 presents a more detailed block diagram of a guidance and control system utilizing the present invention. The system shown in FIG. 6 includes guidance and navigation system 40, IMU 42, and flight control system 60. The flight control system includes autopilot 44, fin mixer 46, and other components described below. IMU 42 senses the translational and rotational movement of the missile, and transmits signals representing these movements to guidance and navigation system 40 via line 62. IMU 42 also transmits rotational movement information to flight control system 60 via line 64. This rotational movement information comprises a vector quantity, and is symbolized by $\Delta\theta$ in FIG. 6. As further described below, the rotation vector $\Delta\theta$ is used by the autopilot for damping purposes.

Guidance and navigation system 40 receives the missile movement data over line 62, determines present position, compares this data to the desired trajectory, and in response generates a steering command $\overline{A}_c$ representing a desired lateral acceleration of the missile. The steering command vector $\overline{A}_c$ is transmitted to the flight control system via line 66. The guidance and navigation system also computes the missile velocity vector $\overline{V}$, the gravity vector $\overline{g}$, and the missile altitude h, and transmits this data to the flight control system via lines 67, 68, and 69, respectively.

Flight control system 60 includes transformation controller 70 and transformation blocks 71–74. Transformation controller 70 receives the steering command $\overline{A}_c$ from guidance and navigation system 40, examines the components $a_c$ and $b_c$, and computes the transformation matrix T. In the formulation shown in Equation (3), transformation controller 70 simply determines whether $P_s$ is equal to +1 or −1. This transformation matrix is then applied to the four vector quantities $\overline{A}_c$, $\overline{V}$, $\overline{g}$, and $\Delta\theta$ received by the flight control system, by transformation steps 71–74, respectively. The transformed velocity and gravity vectors, together with the altitude on line 69, are used by gain computer 48 to calculate present values of the feedback variables a and b, and the autopilot gains. The transformed angular rotation vector $\Delta\theta$, with roll, pitch, and yaw components p, q, and r, is used by the autopilot for damping purposes in a conventional manner. It is also used by the gain computer in the calculation of a and b. The transformed steering command components $a_t$ and $b_t$ are input directly to autopilot 44, and are also input to roll error generator 80 that computes the roll error $\phi_e$, in accordance with Equation (5). The roll error $\phi_e$ is then transmitted to the autopilot along with the transformed pitch and yaw components $a_t$ and $b_t$. These three components ($\phi_e$, $a_t$, $b_t$) comprise the steering command in the transformed coordinate system.

Using the transformed roll, pitch and yaw commands and the fed back variables, autopilot 44 produces roll, pitch, and yaw outputs $\delta_a$, $\delta_e$, and $\delta_r$, respectively. These outputs must now be applied correctly to the fins, depending upon the direction of rotation caused by transformation matrix T, to produce the four fin commands $\delta_1$–$\delta_4$. The appropriate transformation is as follows:

$$\begin{vmatrix} \delta_1 \\ \delta_2 \\ \delta_3 \\ \delta_4 \end{vmatrix} = \begin{vmatrix} 1 & -P_s & 1 \\ 1 & -1 & -P_s \\ 1 & P_s & -1 \\ 1 & 1 & 1 \end{vmatrix} \cdot \begin{vmatrix} \delta_a \\ \delta_e \\ \delta_r \end{vmatrix} \quad (6)$$

In effect, Equation (6) transforms the fin mixing and the inverse coordinate transformation into a single step. It can be seen that a positive aileron (roll) output $\delta_a$ will deflect the fins so as to produce a positive rolling moment. A positive elevator (pitch) output $\delta_e$ will deflect the fins to produce a negative pitching moment in the autopilot pitch plane, no matter how that plane is oriented with respect to the physical missile. Similarly, a positive rudder (yaw) output $\delta_r$ will deflect the fins to generate a negative yawing moment, conforming to conventional airframe nomenclature.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A control system for a missile having a longitudinal axis, the control system comprising:
   a guidance and navigation system, the guidance and navigation system comprising means for producing a steering command in a body coordinate system, the steering command having pitch and yaw components and indicating a direction of a desired acceleration of the missile in a plane normal to the missile longitudinal axis;
   means for transforming the steering command in the body coordinate system into a transformed steering command having pitch and yaw components in one of N different transformed coordinate systems, N being greater than 1;
   means for selecting said one transformed coordinate system such that in said one transformed coordinate system, the ratio of the yaw component to the pitch component is smaller than said ratio in the body coordinate system;
   an autopilot including means for receiving the transformed steering command and for producing corresponding pitch, yaw, and roll output signals; and
   means for transforming the output signals into the body coordinate system.

2. The system of claim 1, wherein the missile has four symmetrically positioned fins, and wherein each transformed coordinate system has pitch and yaw axes positioned between the fins.

3. The system of claim 2, wherein one transformed coordinate system is rotated +45° about the longitudinal axis with respect to the body coordinate system, and a second transformed coordinate system is rotated −45° about the longitudinal axis with respect to the body coordinate system.

4. The system of claim 1, wherein one transformed coordinate system is rotated 90° about the longitudinal axis with respect to the body coordinate system, wherein the second transformed coordinate system is not rotated with respect to the body coordinate system.

5. The system of claim 1, further comprising a roll command generator for generating a roll command representing the angle between the pitch component in the transformed coordinate system and the direction indicated by the steering command.

6. The system of claim 1, further comprising a gain computer that includes means for receiving a missile velocity signal and a gravity vector signal and for computing therefrom gains for use by the autopilot, and means for transforming the velocity and gravity vector signals into the transformed coordinate system.

* * * * *